United States Patent
Qaiyum et al.

(10) Patent No.: US 9,667,134 B2
(45) Date of Patent: May 30, 2017

(54) STARTUP CIRCUIT FOR REFERENCE CIRCUITS

(71) Applicant: Texas Instruments Deutschland GMBH, Freising (DE)

(72) Inventors: Asif Qaiyum, Freising (DE); Matthias Arnold, Zolling (DE)

(73) Assignee: TEXAS INSTRUMENTS DEUTSCHLAND GMBH, Freising (DE)

( * ) Notice: Subject to any disclaimer, the term of this patent is extended or adjusted under 35 U.S.C. 154(b) by 0 days.

(21) Appl. No.: 14/854,600

(22) Filed: Sep. 15, 2015

(65) Prior Publication Data

US 2017/0077800 A1    Mar. 16, 2017

(51) Int. Cl.
*G05F 3/26* (2006.01)
*H02M 1/36* (2007.01)

(52) U.S. Cl.
CPC .............. *H02M 1/36* (2013.01); *G05F 3/267* (2013.01)

(58) Field of Classification Search
CPC ... G05F 3/30; G05F 3/20; G05F 3/222; G05F 3/242; G05F 3/26; G05F 3/262; G05F 1/10; G05F 1/46; G05F 1/562; G05F 1/563
USPC .......... 323/313–316, 901; 327/538, 539, 543
See application file for complete search history.

(56) References Cited

U.S. PATENT DOCUMENTS

| | | | | |
|---|---|---|---|---|
| 5,629,611 A * | 5/1997 | McIntyre | ................. | G05F 3/267 323/313 |
| 5,666,044 A * | 9/1997 | Tuozzolo | ................. | G05F 1/573 323/273 |
| 6,150,872 A * | 11/2000 | McNeill | ..................... | G05F 3/30 323/313 |
| 6,232,829 B1 * | 5/2001 | Dow | ........................ | G05F 3/265 323/315 |
| 7,535,285 B2 * | 5/2009 | Colman | ..................... | G05F 3/30 323/313 |
| 7,768,248 B1 * | 8/2010 | Hyde | ........................ | G05F 3/24 323/315 |
| 7,777,558 B2 * | 8/2010 | Chen | ........................ | G05F 3/30 323/313 |

(Continued)

OTHER PUBLICATIONS

Sansen, "Bandgap and current reference circuits", lecture handout (KULeuven, 2005), pp. 161-69, 1610-53, available at http://iroi.seu.edu.cn/teachers/chym/analog/16.pdf.

(Continued)

*Primary Examiner* — Adolf Berhane
(74) *Attorney, Agent, or Firm* — John R. Pessetto; Charles A. Brill; Frank D. Cimino (57) ABSTRACT

A start-up circuit for a reference circuit such as a bandgap reference circuit. The start-up circuit includes a diode-connected metal-oxide-semiconductor (MOS) transistor connected between a power supply node and a start-up node that is connected in turn to the gate of a current control MOS transistor in the reference circuit. The diode-connected MOS transistor and the current control MOS transistor are matched with one another. To start up the reference circuit, current is conducted through the diode-connected MOS transistor to set the gate voltage of the current control transistor at a threshold voltage below the power supply voltage. Current conducted by the current control transistor initiates operation of the bandgap reference circuit, and disables the start-up circuit.

10 Claims, 5 Drawing Sheets

(56) References Cited

U.S. PATENT DOCUMENTS

| | | | | |
|---|---|---|---|---|
| 7,915,882 | B2* | 3/2011 | Hellums | G05F 1/468 323/312 |
| 8,093,881 | B2* | 1/2012 | Fujiyama | G05F 3/30 323/313 |
| 8,143,878 | B2* | 3/2012 | Kresse | G05F 3/30 323/314 |
| 8,228,053 | B2* | 7/2012 | Stellberger | G05F 3/30 323/313 |
| 8,305,068 | B2* | 11/2012 | Camacho Galeano | G05F 3/262 323/313 |
| 8,358,119 | B2* | 1/2013 | Kim | G05F 3/242 323/313 |

OTHER PUBLICATIONS

Shrimali, "The start-up circuit for a low voltage bandgap reference", 21st IEEE Int'l Conf. on Electronics, Circuits and Systems (IECES) (IEEE, Dec. 2014), pp. 92-95.

Bei, "Design of a Low-Power Bandgap Current Reference", 2010 Int'l Conf. on E-Product E-Service and E-Entertainment (ICEEE) (IEEE, Nov. 2010), pp. 1-3.

* cited by examiner

STARTUP CIRCUIT FOR REFERENCE CIRCUITS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of voltage and current reference circuits as used in integrated circuits. Embodiments are directed to startup circuits for such reference circuits.

The powerful computational and operation functionality provided by modern integrated circuits has enabled the more widespread distribution of computing power in larger-scale systems. One example of such distributed electronic functionality is the so-called "Internet of Things" (IoT) contemplates the widespread deployment of electronic devices as sensors and controllers, with networked communications among those devices. Modern smartphones and wearables also deploy computational and operational functionality into a large number of distributed nodes; implantable medical devices constitute another type of distributed functionality. Many of these applications necessitate the use of batteries or energy scavenging devices to power the integrated circuits. As such, many modern integrated circuits are called upon to be "power-aware", designed to consume minimal power during operation and standby.

Voltage and current reference circuits are important functions in a wide range of modern analog, digital, and mixed-signal integrated circuits, in order to optimize the performance of such circuits as operational amplifiers, comparators, analog-to-digital and digital-to-analog converters, oscillators, phase-locked loops and other clock circuits, and the like. This optimization is especially important for power-aware applications in which power consumption can be a dominating factor in circuit and system design. As well known in the art, voltage and current reference circuits ideally generate their reference levels in a manner that are stable over variations in process parameters, power supply voltage levels, and operating temperature (PVT).

Figure 1A:
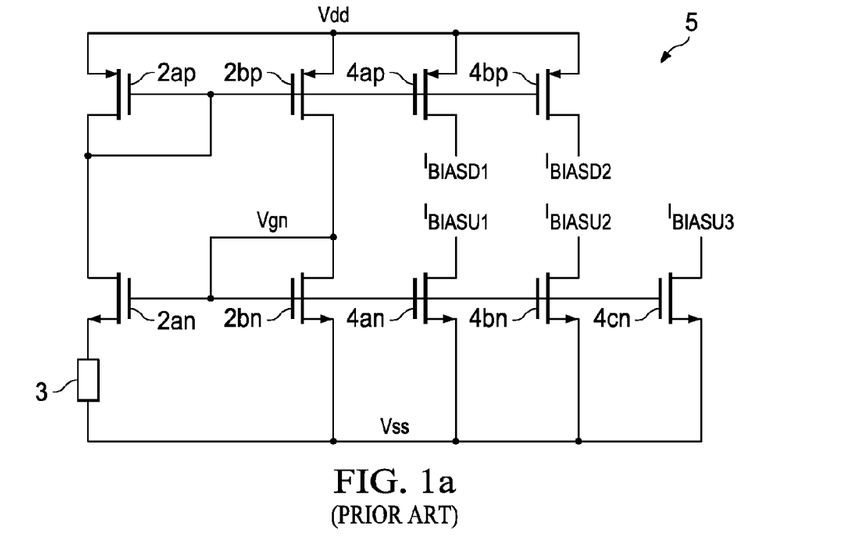
FIGS. 1a and 1b are electrical diagrams, in schematic form, of conventional reference circuits.

FIG. 1a illustrates bias reference circuit 5, constructed in the conventional manner as well known in the art. This bias reference circuit 5 includes p-channel metal-oxide-semiconductor (PMOS) transistors 2ap, 2bp coupled in current mirror fashion, with their sources at the Vdd power supply and their gates coupled together at the drain of transistor 2ap. The drain of transistor 2ap is coupled to the drain of n-channel MOS (NMOS) transistor 2an, which has its source coupled to the Vss reference level through resistor 3. The gate of NMOS transistor 2an is coupled in current mirror fashion to the gate and drain of NMOS transistor 2bn, which has its source at Vss. These interconnected PMOS and NMOS current mirrors establish a self-bias loop, in which the PMOS current mirror enforces equality of the NMOS drain currents (assuming transistors 2ap and 2bp are of the same size), which renders the voltage Vgn at the gates of NMOS transistors 2an, 2bn, as well as the gate voltage at PMOS transistors 2ap, 2bp to be relatively independent of the Vdd voltage. The PMOS gate voltage can be applied to the gates of output PMOS transistors 4ap, 4bp to produce stable bias currents $I_{BIASD1}$, $I_{BIASD2}$, respectively, and the NMOS gate voltage Vgn can be applied to the gates of output NMOS transistors 4an, 4bn, 4cn to produce stable bias currents $I_{BIASU1}$, $I_{BIASU2}$, $I_{BIASU3}$, respectively, as shown in FIG. 1a.

Figure 1B:
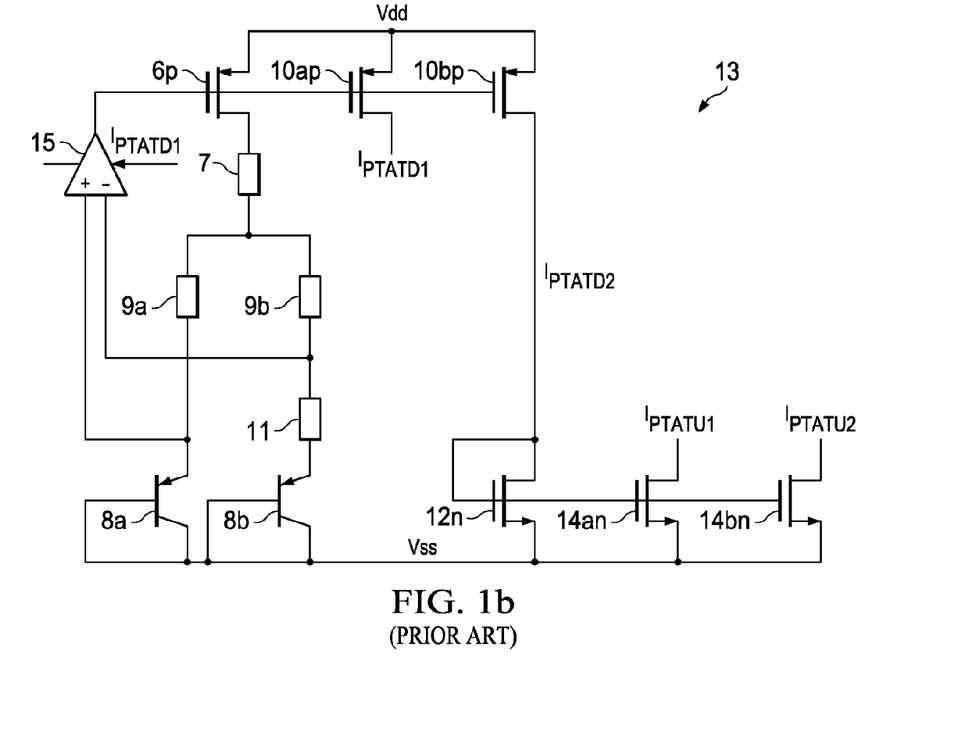

FIG. 1b illustrates "bandgap" reference circuit 13, constructed in the conventional manner as another type of reference circuit known in the art. As in the case of bias reference circuit 5 of FIG. 1a, bandgap reference circuit 13 is also self-biased and thus not sensitive to the Vdd voltage; in addition, bandgap reference circuit 13 is additionally designed to be stable over temperature variations. This temperature stability derives from its output reference voltage being based on both a parameter that varies proportionally with temperature (proportional to absolute temperature, or PTAT) and also a parameter that is complementary to absolute temperature (CTAT). In the example of FIG. 1b, PMOS transistor 6p, with its source at Vdd, serves as a current source, with its gate controlled by the output of amplifier 15. The drain of PMOS transistor 6p is connected to two bipolar transistor legs through resistor 7. One leg is formed by resistor 9a connected between resistor 7 and the emitter of p-n-p transistor 8a; the other leg is formed by resistor 9b connected between resistor 7 and resistor 11, which in turn is connected to the emitter of p-n-p transistor 8b. The bases and collectors of transistors 8a, 8b are connected to the Vss reference level. P-n-p transistors 8a, 8b may be realized as parasitic devices in conventional CMOS processes, as is common in the art. In this conventional arrangement, the emitter of transistor 8a is connected to one input of amplifier 15, while the other input of amplifier 15 is connected to the node between resistors 9b and 11. In this way, the output voltage AMPOUT from amplifier 15 is based on a CTAT voltage (the base-emitter voltage of transistor 8a) and a PTAT voltage (the difference in the base-emitter voltages of transistors 8a, 8b, which is reflected as the voltage drop across resistor 11). In addition to providing the gate voltage of PMOS transistor 6p in a self-bias manner, this output voltage AMPOUT also sets the gate voltage of output PMOS transistors 10ap, 10bp, which produce reference currents $I_{PTATD1}$, $I_{PTATD2}$, respectively. Reference current $I_{PTATD1}$ also serves as the bias current for amplifier 15. The drain of output PMOS transistor 10bp is connected to the drain of NMOS transistor 12n, which is connected in diode fashion. The resulting gate and drain voltage of transistor 12n also serves as the gate voltage of output NMOS transistors 14an, 14bn, which produce reference currents $I_{PTATU1}$, $I_{PTATU2}$, respectively.

Each of the well-known self-biased reference circuits shown in FIGS. 1a and 1b, as well as other conventional self-biased reference circuits, have two stable operating points, namely the zero current point (e.g., no current conducted by transistors 2ap, 2bp, 2an, 2bn of FIG. 1a) and a non-zero current point that is, of course, the desired operating point. Start-up circuits are typically added to these reference circuits to ensure power-up into the desired operating state.

Figure 2A:
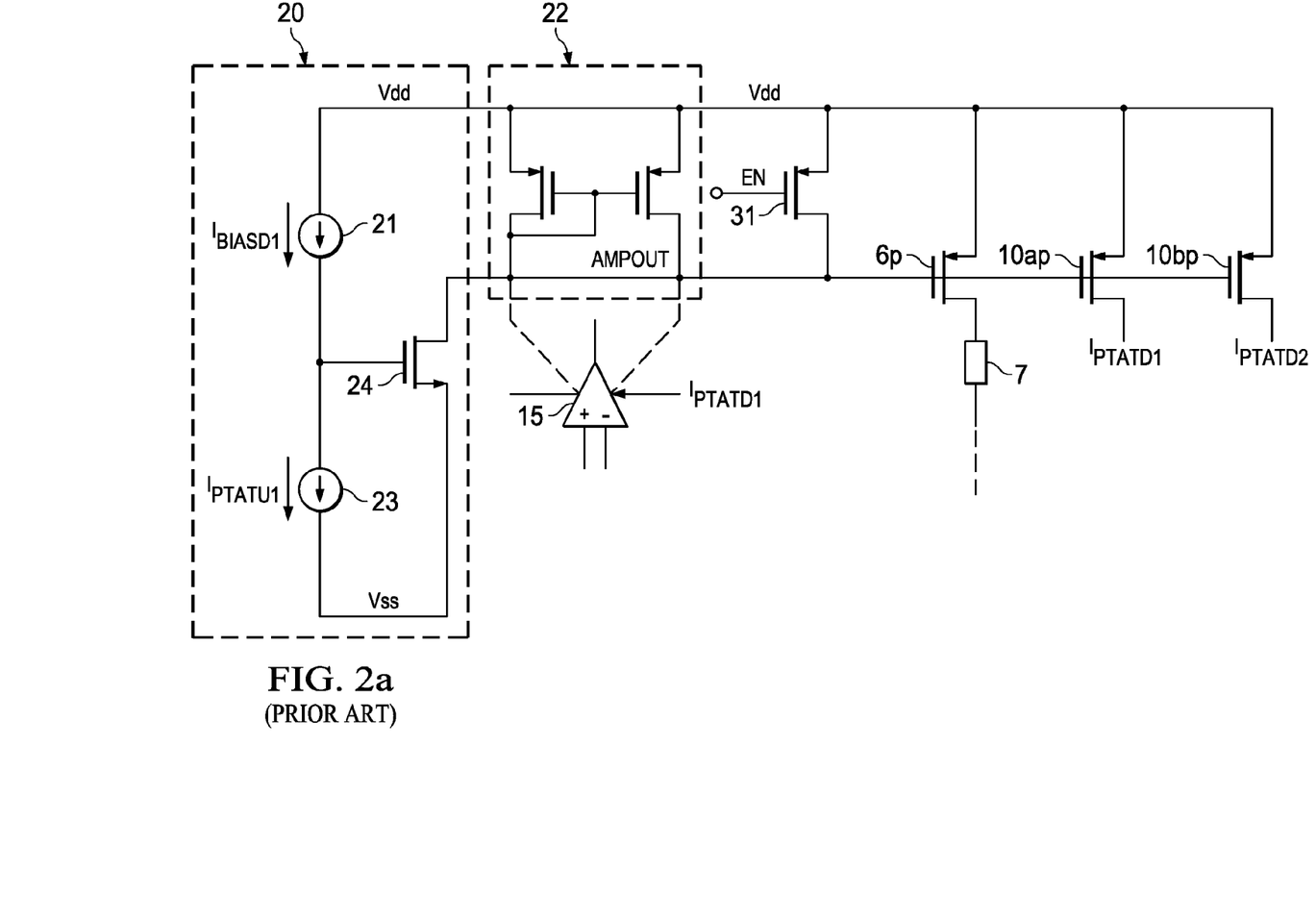
FIGS. 2a and 2b are electrical diagrams, in schematic form, of conventional start-up circuits for reference circuits.

FIG. 2a illustrates an example of a conventional "common-source" start-up circuit, as applied to bandgap reference circuit 13 of FIG. 1b (shown in part in FIG. 2a). In this example, start-up circuit 20 includes current source 21 and current source 23 connected in series between the Vdd power supply and the Vss reference level, and NMOS transistor 24 with its gate connected at a node between current sources 21 and 23. In this example, current source 21 conducts a current $I_{BIASD1}$, and may be constituted by an output transistor of a reference circuit (e.g., by output transistor 4ap in bias reference circuit 5 of FIG. 1a) external to bandgap reference circuit 13 and thus not dependent on its start-up. Current source 23 conducts the current $I_{PTATU1}$, and as such is constituted by an output transistor of bandgap reference circuit 13 itself, for example transistor 14an in the circuit of FIG. 1b. In this example, amplifier 15 of bandgap reference circuit 13 includes active load 22 at its output, as is typical in the art. In the conventional fashion, active load 22 is provided by a current mirror arrangement of PMOS transistors, with output node AMPOUT at the drain of the PMOS transistor in the mirror leg as shown in FIG. 2a. The drain of NMOS transistor 24 is connected to amplifier output node AMPOUT, and the source of transistor 24 is at Vss. As conventional, bandgap reference circuit 13 includes PMOS transistor 31 with its source and drain connected between the Vdd power supply voltage and node AMPOUT, and its gate receiving enable signal EN. PMOS transistor 31 thus serves to maintain node AMPOUT at Vdd when bandgap reference circuit 13 is not enabled (i.e., enable signal EN is at a low logic level), which keeps that node from floating and ensures that output transistors 6p, 10ap, 10bp are off; while bandgap reference circuit 13 is enabled by enable signal EN at a high logic level, PMOS transistor 31 is held off and does not affect the operation of the circuit. In operation, current $I_{PTATU1}$ is initially zero, prior to the start-up of bandgap reference circuit 13. On the other hand, external current $I_{BIASD1}$, which is present at start-up, pulls up the gate of transistor 24 toward the Vdd power supply voltage, turning on transistor 24 and pulling down node AMPOUT from its initial Vdd level (due to PMOS transistor 31 being on prior to enable) toward Vss. The low voltage at node AMPOUT turns on PMOS transistor 6p, which initializes conduction in transistors 8a, 8b of bandgap reference circuit 13 and ensures development of the desired reference voltages and currents. Once bandgap reference circuit 13 starts up as desired, current $I_{PTATU1}$ at a level designed to overwhelm bias current $I_{BIASD1}$, turning off transistor 24 and thus allowing amplifier 15 to control the generation of the various reference currents. In this manner, the current comparison between currents $I_{PTATU1}$ and $I_{BIASD1}$ at the gate of transistor 24 effectively implements a "handshaking" function between bandgap reference circuit 13 and start-up circuit 20, in that the current $I_{PTATU1}$ that is generated by bandgap reference circuit 13 itself signals to start-up circuit 20 that it is to shut off.

While conventional start-up circuit 20 starts up bandgap reference circuit 13 at its desired operating point, it is quite sensitive to variations in the Vdd power supply voltage, as well as to process variations (i.e., variations in transistor parameters). In addition, NMOS transistor 24 is configured as a common-source amplifier in start-up circuit 20, which typically has a relatively high gain as known in the art. The high gain loop presented by this arrangement start-up circuit 20 is a significant source of instability in the overall bandgap reference circuit configuration.

Figure 2B:
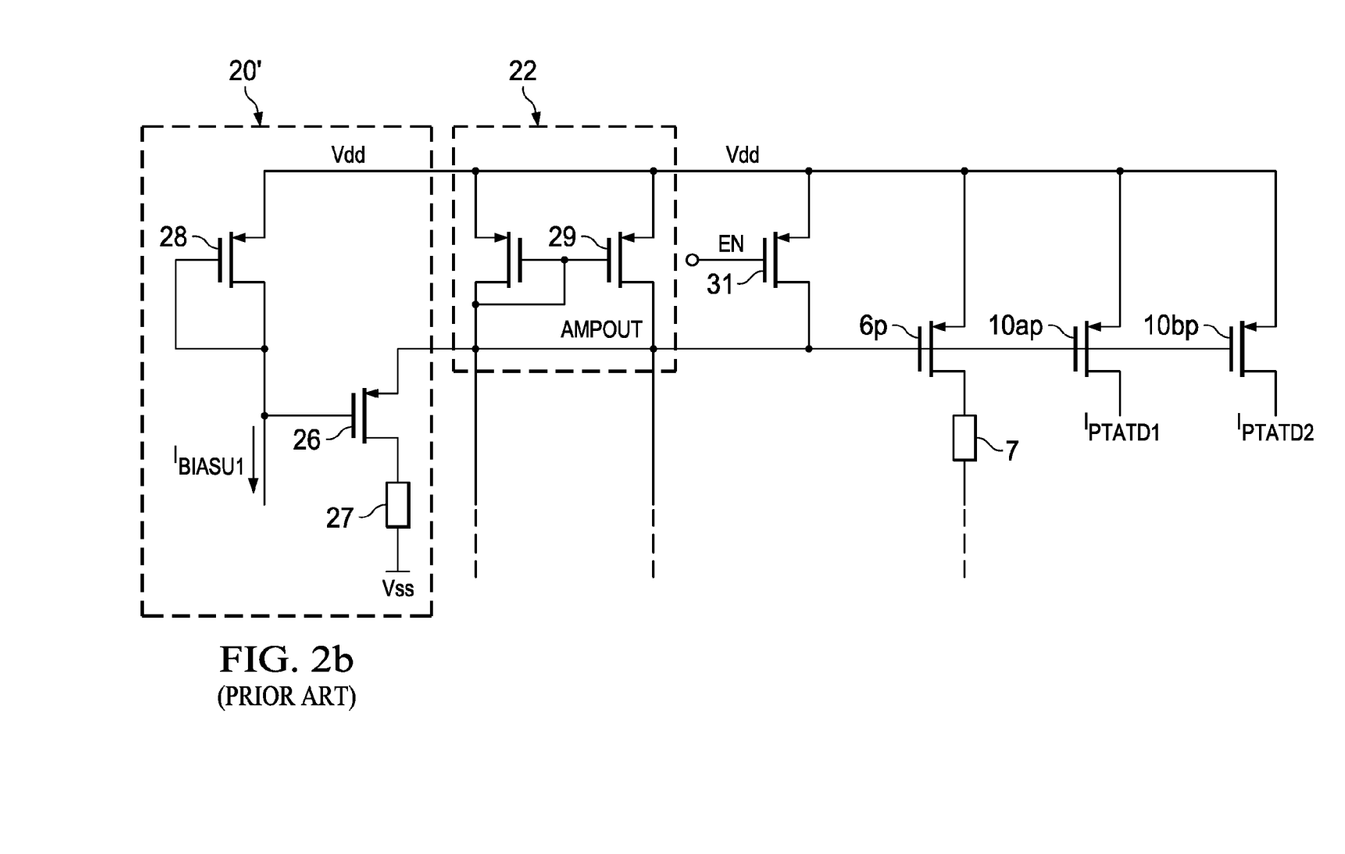

FIG. 2b illustrates an example of another type of conventional start-up circuit known in the art as a "self-turn-off" start-up circuit. In this start-up circuit 20', the amplifier output node AMPOUT is connected to the source of PMOS transistor 26, which has its drain connected to the Vss level through resistor 27. The gate of transistor 26 is coupled to the Vdd voltage via diode-connected PMOS transistor 28, and is pulled down by external current $I_{BIASU1}$, such as may be generated by a bias reference circuit (e.g., circuit 5 of FIG. 1a). As in the circuit of FIG. 2a, PMOS transistor 31 holds node AMPOUT at the Vdd voltage prior to enabling of the circuit, ensuring startup from a known state upon enable signal EN turning off transistor 31. In operation at power-up, diode-connected PMOS transistor 28 will conduct reference current $I_{BIASU1}$, which places its gate and drain voltage at a threshold voltage below the Vdd voltage (i.e., Vdd−Vt). This voltage Vdd−Vt also appears at the gate of transistor 26, while node AMPOUT is initially at a full Vdd voltage due to PMOS transistor 31 having been on prior to the enabling of the circuit. As a result, the gate-to-source voltage at transistor 26 is at its threshold voltage Vt, which turns on transistor 26 to conduct current to Vss through resistor 27, pulling down node AMPOUT at the drain of transistor 29 and the gate of transistor 6p toward Vss. Transistor 6p turns on accordingly, initiating the operation of the bandgap reference circuit. As the voltage at node AMPOUT is pulled down, transistor 26 turns off (its gate being clamped to Vdd−Vt), which effectively isolates start-up circuit 20' from affecting the operation of bandgap reference circuit 13.

This conventional self-turn-off start-up circuit 20' also has several limitations, particularly as used in modern power-aware integrated circuits. A first limitation is that no "handshaking" between start-up circuit 20' and the reference circuit that it is starting up. This absence of handshaking control can result in significant power consumption if start-up circuit 20' is slow or has failed. In addition, process variations in the manufacture of these conventional start-up circuits 20, 20' can result in the output of amplifier 15 at node AMPOUT being driven fully to Vss, which requires a significant amount of charge (i.e., energy) before settling at the desired operating node. Because limiting of power consumption is critical in many power-aware systems, especially those in which "energy harvesting" is used to provide system power from a capacitor, this conventional start-up circuit 20' is not favored for those applications.

BRIEF SUMMARY OF THE INVENTION

Disclosed embodiments provide a start-up circuit for a voltage or current reference circuit that provides improved stability and robustness over process, voltage, and temperature.

Disclosed embodiments provide such a circuit that is inherently stable.

Disclosed embodiments provide such a circuit that consumes essentially no power following start-up.

Disclosed embodiments provide such a circuit in which the current conducted by the start-up circuit is highly scalable relative to the currents conducted in the reference circuit.

Disclosed embodiments provide such a circuit that assists in the fast settling of the reference circuit.

Disclosed embodiments provide such a circuit that is simple to implement.

Other objects and advantages of the disclosed embodiments will be apparent to those of ordinary skill in the art having reference to the following specification together with its drawings.

According to certain embodiments, a start-up circuit and method of operating the same is provided for a reference circuit having a primary current branch and an amplifier that controls a gate voltage at a current control transistor in the primary current branch. The start-up circuit includes a diode-connected start-up transistor constructed in a matching manner relative to the current control transistor, and a current source coupled in series with the start-up transistor. In start-up, the current conducted by the current source turns on the start-up transistor, which biases the gate of the current control transistor so as to conduct. In some embodiments, switch logic controls switches in the start-up circuit in response to a current generated by the reference circuit, to eliminate current consumption in the start-up circuit after start-up.

DETAILED DESCRIPTION OF THE INVENTION

The one or more embodiments described in this specification are implemented into a start-up circuit for voltage and current reference circuits realized by way of complementary metal-oxide-semiconductor (CMOS) technology, as it is contemplated that such implementation is particularly advantageous in that context. However, it is also contemplated that concepts of this invention may be beneficially applied to other applications, for example according to MOS, bipolar, and BiCMOS technologies. Accordingly, it is to be understood that the following description is provided by way of example only, and is not intended to limit the true scope of this invention as claimed.

Figure 3:
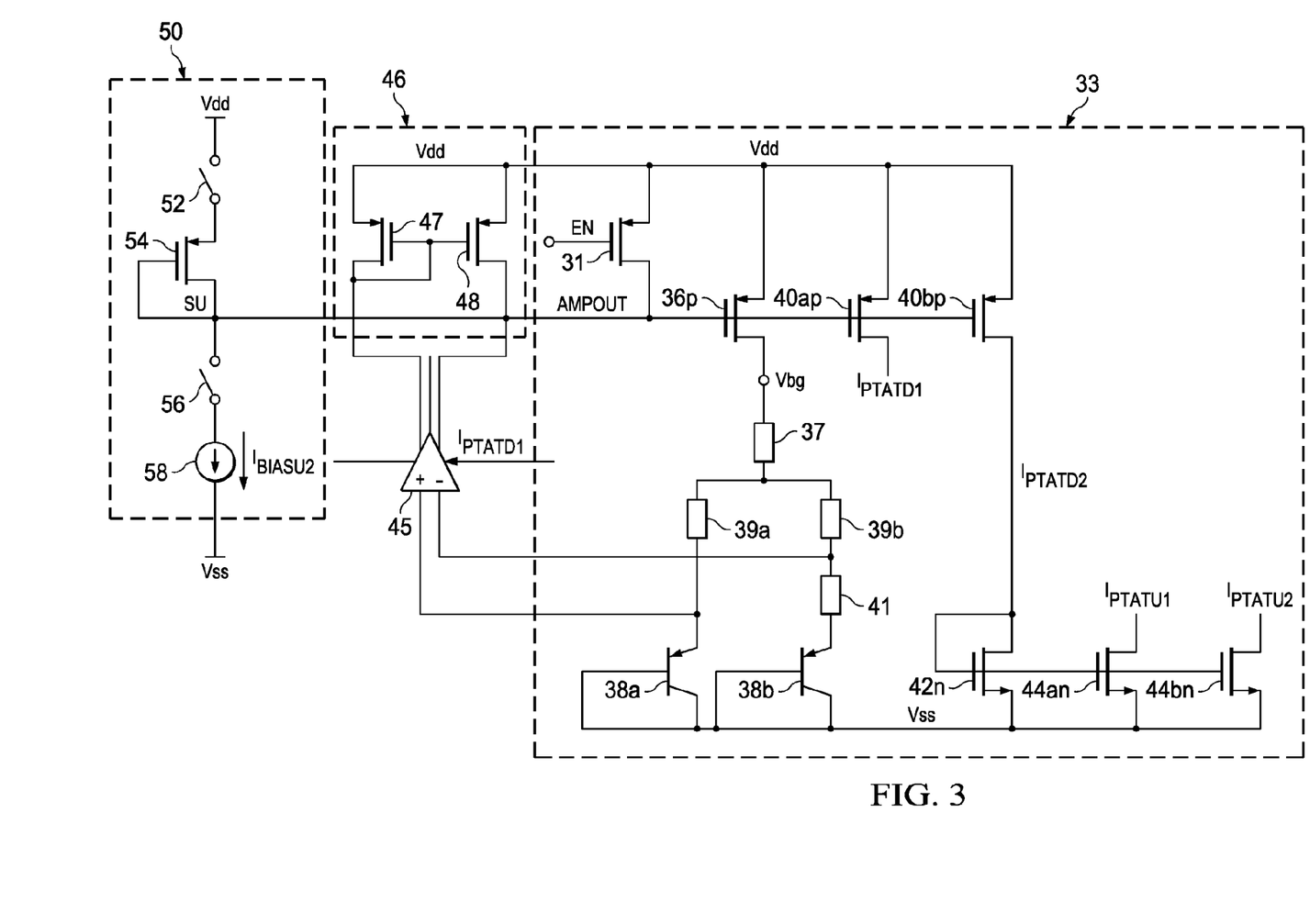
FIG. 3 is an electrical diagram, in schematic form, of a start-up circuit for a bandgap reference circuit according to an embodiment.

Referring now to FIG. 3, a reference circuit including a start-up circuit according to an embodiment will now be described. In this embodiment, the reference circuit includes bandgap reference circuit 33, which is constructed largely in the conventional manner as described above relative to FIG. 1b. Specifically, bandgap reference circuit 33 includes a primary current branch including PMOS transistor 36p with its source at Vdd and its drain connected through resistor 37 to the two circuit legs including respective p-n-p bipolar transistors 38a and 38b. It is contemplated that transistors 38a, 38b will be parasitic bipolar transistors in CMOS integrated circuits; alternatively these transistors 38a, 38b may be conventional bipolar transistors, for example as in BiCMOS integrated circuits. In the first leg, resistor 39a is connected between resistor 37 and the emitter of transistor 38a, which has its base and collector at the Vss ground reference level; in the second leg, resistors 39b and 41 are connected in series between resistor 37 and the emitter of transistor 38b, which also has its base and collector at Vss. Similarly as in the conventional circuit of FIG. 1b, the emitter of transistor 38a is connected to one input of amplifier 45, and the node between resistors 39b and 41 is applied to the other input of amplifier 45.

Amplifier 45 is a conventional differential amplifier that drives active load 46, as is typical in many implementations. Active load 46 in this embodiment is in the form of a PMOS current mirror, with the current conducted by diode-connected PMOS transistor 47 mirrored by PMOS transistor 48. Transistor 47 has its source at Vdd and its gate and drain in diode connection, while transistor 48 has its gate tied to the gate of transistor 47, its source at Vdd, and its drain driven by amplifier 45 at amplifier output node AMPOUT. In the conventional manner for bandgap reference circuits, the voltage at amplifier output node AMPOUT is based on the combination of a CTAT voltage (the base-emitter voltage of transistor 38a) and a PTAT voltage (the voltage drop across resistor 41 corresponding to the difference in base-emitter voltages between transistors 38a, 38b), and is thus relatively insensitive to temperature. Amplifier output node AMPOUT is connected to the gate of transistor 36p in the primary current branch of bandgap reference circuit 33. The voltage at amplifier output node AMPOUT controls conduction through transistor 36p, and thus controls the current conducted in the primary current branch through resistor 37 to the legs including bipolar transistors 38a, 38b. The connection of nodes in the two bipolar transistor legs to respective inputs of amplifier 45 closes the control loop. As described above relative to the conventional circuits of FIGS. 2a and 2b, PMOS transistor 31 is provided to maintain node AMPOUT at Vdd when bandgap reference circuit 33 is not enabled (i.e., enable signal EN at its gate is at a low logic level), and to ensure startup from a known state.

Bandgap reference circuit 33 also includes one or more output legs. PTAT pull-up currents $I_{PTATD1}$, $I_{PTATD2}$ are presented by PMOS transistors 40ap, 40bp, respectively, which each have their source nodes at the Vdd power supply and their gates driven by amplifier output node AMPOUT. In this embodiment, reference current $I_{PTATD1}$ also serves as the bias current for amplifier 45. The drain of transistor 40bp is connected to the drain and gate of diode-connected NMOS transistor 42n. This voltage at the drains of transistors 40bp and 42n also sets the gate voltages of NMOS output transistors 44an, 44bn, and thus their respective PTAT pull-down currents $I_{PTATU1}$, $I_{PTATU2}$.

In the example of this embodiment as shown in FIG. 3, start-up circuit 50 is provided to initiate conduction in the primary current branch of bandgap reference circuit 33 and ensure its operation at a non-zero-current stable operating point. In this embodiment, start-up circuit 50 includes controllable switch 52 connected in series with the source-drain path of PMOS start-up transistor 54 between the Vdd power supply voltage and start-up node SU, which is connected to amplifier output node AMPOUT. PMOS transistor 54 is connected in diode fashion, with its gate connected to its drain at start-up node SU. According to this embodiment, start-up circuit 50 also includes controllable switch 56 connected in series with current source 58 between start-up node SU and the Vss ground reference level. Current source 58 conducts an external current (i.e., a current generated by a circuit other than bandgap reference circuit 33 that is being started up by start-up circuit 50), such as reference current $I_{BIASU2}$ as generated by an instance of bias reference circuit 5 elsewhere in the same integrated circuit.

According to this embodiment, start-up transistor 54 of start-up circuit 50 is constructed to closely match current control transistor 36p in the primary current branch of bandgap reference circuit 33. The construction of these transistors 36p, 54 is matching in the sense that variations in transistor parameters such as transistor channel length and threshold voltage, for example due to process variations, appear equivalently in both of transistors 36p, 54. In this regard, it is not essential that transistors 36p, 54 have the same current drive capability. For example, the channel width of transistor 36p may be scaled relative to that of transistor 54 (i.e., in a ratio of m:1) while constructed with the same channel length, such that the W/L ratios of transistor 36p relative to of transistor 54 obey a ratio that is also m:1. In this manner, transistors 36p, 54 will be of matching construction such that variations in transistor parameters will equivalently affect transistors 36p, 54, according to the m:1 multiple in channel width where applicable (e.g., variations in channel length affecting the W/L ratio).

Figure 4:
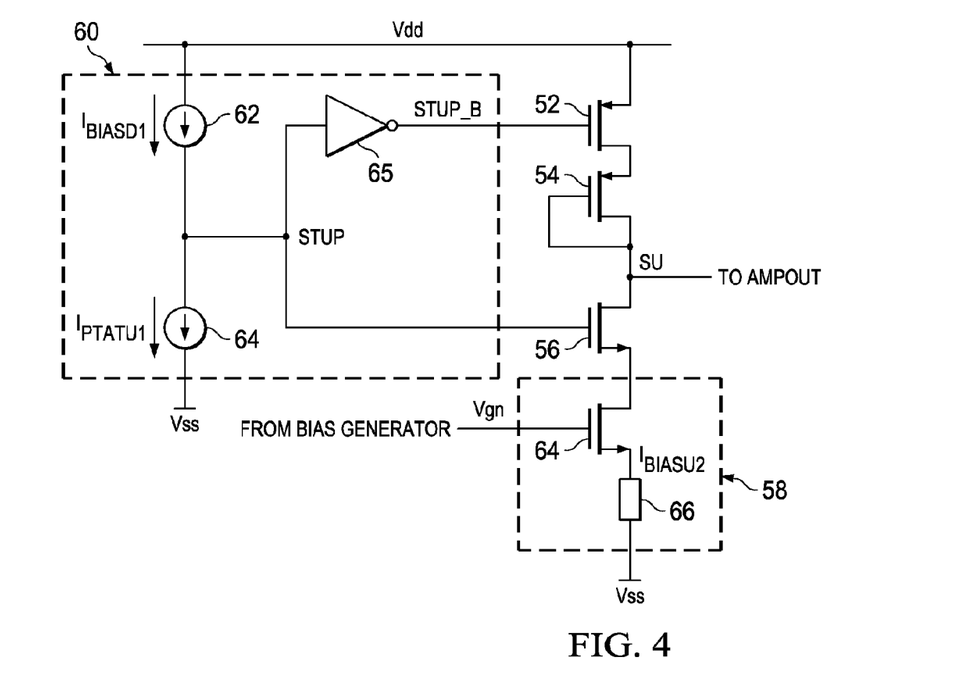
FIG. 4 is an electrical diagram, in schematic form, of switch logic in the start-up circuit of FIG. 3 according to an embodiment.

FIG. 4 illustrates one implementation of start-up circuit 50 according to this embodiment. In this implementation, switch 52 is realized by a PMOS transistor with its source at the Vdd power supply voltage and its drain connected to the source of PMOS start-up transistor 54. The gate of PMOS transistor 52 is controlled by switch logic 60. Similarly, switch 56 is realized in this implementation by an NMOS transistor with its drain at start-up node SU, its source coupled to current source 58, and its gate also controlled by switch logic 60. Alternatively, switches 52, 56 may be realized as complementary (PMOS/NMOS) pass transistors connected in parallel and receiving complementary logic signals from switch logic 60, as known in the art.

Switch logic 60 in this implementation operates to close switches 52, 56 in order to start-up bandgap reference circuit 33, and to open switches 52, 56 once bandgap reference circuit 33 has started up. In this implementation, switch logic 60 is realized by a current comparator including current source 62 and current source 64, connected in series between the Vdd power supply and the Vss ground reference level. Current source 62 is connected between Vdd and node STUP, and conducts a current produced external to the circuit being started up by start-up circuit 50, for example from an instance of a bias reference circuit realized elsewhere in the same integrated circuit. In the example of FIG. 4, current source 62 corresponds to output transistor 4ap of bias reference circuit 5 (FIG. 1a) and thus conducts current $I_{BIASD1}$. Current source 64 is connected between node STUP and the Vss ground reference level, and conducts a current generated by the circuit being started up. In the example of FIG. 4, current source 64 is realized by NMOS output transistor 44an of bandgap reference circuit 33 and thus conducts current $I_{PTATU1}$ once bandgap reference circuit 33 starts up. Node STUP is connected to the gate of NMOS switch transistor 56, and to the input of inverter 65, which in turn drives the gate of PMOS switch transistor 52 at node STUP_B.

In the implementation of this embodiment shown in FIG. 4, current source 58 is realized by NMOS transistor 64 with its drain connected to the source of NMOS switch transistor 56, and its source coupled through resistor 66 to the Vss ground reference level. The gate of NMOS transistor 64, in this example, receives a bias voltage generated external to the circuit being started up. In the example of FIG. 4, this bias voltage is NMOS gate voltage Vgn generated by an instance of bias reference circuit 5 realized elsewhere in the same integrated circuit, in which NMOS transistor 64 corresponds to NMOS output transistor 4bn and thus conducts reference current $I_{BIASU2}$.

It is contemplated that those skilled in the art having reference to this specification will be readily able to implement start-up circuit 50, including switch logic 60, according to alternative arrangements, it being understood that such alternative arrangements and other variations are within the scope of these embodiments.

Figure 5:
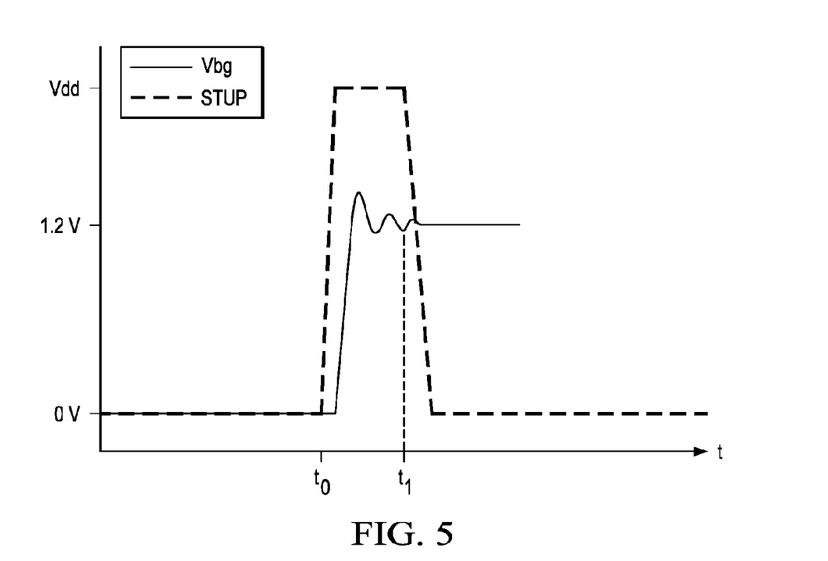
FIG. 5 is a timing diagram illustrating the operation of the start-up circuit of FIG. 3 according to an embodiment.

The operation of start-up circuit 50 according to this embodiment, including the realization described above relative to FIG. 4, will now be described with reference to the timing diagram of FIG. 5. In this example, it is contemplated that the integrated circuit including bandgap reference circuit 33 powers up according to a pre-arranged sequence, such that some circuits outside of bandgap reference circuit 33 are operational prior to the enabling of start-up circuit 50 and bandgap reference circuit 33. More specifically for this example, it is contemplated that at least one circuit capable of generating a current, such as an instance of bias reference circuit 5 of FIG. 1a (perhaps with its own instance of start-up circuit 50) is operational prior to time $t_0$ in FIG. 5.

At time $t_0$, bandgap reference circuit 33 is enabled for operation according to the power on or other operational sequence for the integrated circuit. In this example, at this time $t_0$, the external current $I_{BIASD1}$ sourced by current source 62 is applied to switch logic 60, which initially pulls node STUP to the Vdd voltage, considering that current $I_{PTATU1}$ (generated by bandgap reference circuit 33 itself) is initially at zero. The high logic level of node STUP (and corresponding low logic level at node STUP_B from inverter 65) will turn on (i.e., close) switch transistors 52, 56 in start-up circuit 50, causing external current $I_{BIASU2}$ to be drawn through diode-connected PMOS transistor 54. The diode-connected configuration of transistor 54 results in the developing of a voltage at node SU that is about one threshold voltage below the Vdd power supply voltage (i.e., Vdd−Vt).

Referring to FIG. 3, PMOS transistor 54 and current control transistor 36p constitute a PMOS current mirror because their gates are connected together to start-up node SU, and thus have the same gate-to-source voltage. As such, upon the closing of switches 52, 56, the gate voltage at current control transistor 36p will also be about Vdd−Vt, because transistors 36p, 54 are matched with one another as discussed above. Accordingly, the same external current $I_{BIASU2}$ conducted by current source 58 and thus conducted by transistor 54 will be mirrored in current control transistor 36p. If transistors 36p, 54 are scaled relative to one another, their relative currents will also be scaled according to the same ratio. The mirrored current conducted by current control transistor 36p will initiate conduction in both bipolar transistor legs of bandgap reference circuit 33, and the corresponding voltages that develop in those legs will appear at the inputs of amplifier 45.

According to the construction of bandgap reference circuit 33 in this embodiment, the voltage at the gate of current control transistor 36p in the primary current branch will also appear at output PMOS transistors 40ap, 40bp, generating reference currents $I_{PTATD1}$, $I_{PTATD2}$, respectively. In this implementation, the current $I_{PTATD2}$ is conducted through diode-connected NMOS transistor 42n and establishes the gate voltage at transistor 42an, which is applied to output NMOS transistors 44an, 44bn to produce reference currents $I_{PTATD1}$, $I_{PTATD2}$, respectively. Referring to the example of FIG. 5, following the rising edge of node STUP, reference voltage Vbg at the node between the drain of transistor 36p and resistor 37 also rises, indicating the flow of current through the bipolar transistor legs of bandgap reference circuit 33.

As described above in connection with the implementation of FIG. 4, reference current $I_{PTATU1}$ generated by output NMOS transistor 40an within bandgap reference circuit 33 itself appears via current source 64 in switch logic 60. It is contemplated that reference current $I_{PTATU1}$ is stronger, by design, than external current $I_{BIASD1}$ conducted by current source 62. This will cause node STUP to be pulled toward the Vss ground reference level, which occurs at about time $t_1$ in the example shown in FIG. 5. Upon node STUP returning to a low logic level, switch transistors 52 (via inverter 65) and 56 will then be turned off, opening the circuit between Vdd and Vss through transistor 64 and current source 58 and ending the start-up sequence. Start-up circuit 50 is thus controlled in a "handshaking" manner with bandgap reference circuit 33, such that it is positively turned off once bandgap reference circuit 33 is conducting current. The zero-current operating point of bandgap reference circuit 33 is thus safely avoided. Amplifier 45 can then assume full control of amplifier output node AMPOUT in response to the voltages at its inputs from the legs of bandgap reference circuit 33, and generate the desired reference currents accordingly. As shown in the example of FIG. 5, as node STUP reaches its low logic level, reference voltage Vbg settles, as amplifier output node AMPOUT no longer sees the voltage at node SU.

An advantage that can be obtained from the use of a start-up circuit according to this embodiment results from amplifier output node AMPOUT not being pulled fully low during the start-up of bandgap reference circuit 33 as in conventional circuits. Rather, in the example of FIG. 3, diode-connected PMOS transistor 54 maintains amplifier output node AMPOUT at about a threshold voltage below the Vdd power supply voltage. This control of amplifier output node AMPOUT eliminates large voltage swings at that node as can occur with conventional start-up circuitry, such as those described above relative to FIGS. 2a and 2b. This embodiment is thus particularly well-suited for integrated circuits implemented in energy harvesting applications, as well as other power-aware implementations.

In addition, the "handshaking" operation of start-up circuits according to this embodiment also ensures reduced power consumption. The start-up circuit in this embodiment is positively turned off in response to its target reference circuit (e.g., bandgap reference circuit 33) conducting sufficient current, regardless of the process/voltage/temperature corner at which the integrated circuit is constructed or operating. Furthermore, the opening of switches in the start-up circuit of this embodiment eliminates the possibility of a DC current path after start-up has completed, reducing to nearly zero the power consumed after start-up by the start-up circuit.

Another advantage that can be provided by this embodiment is the ability to scale the current conducted by the start-up circuit relative to that conducted in the primary current branch of its target reference circuit. In the example of FIG. 3, this scalability in current is provided by the matching construction of diode-connected transistor 54 relative to current control transistor 36p, which allows transistor 54 to conduct a fraction (e.g., the fraction 1/m, where the ratio between sizes of transistors 36p to 54 is m:1) of the current conducted in the primary current branch, while still maintaining good independence of the output reference currents and voltages over variations in process parameters.

In addition, start-up circuits according to this embodiment implement excellent independence of the output levels over variations in power supply voltage (Vdd) and operating temperature.

While this embodiment describes the use of a start-up circuit in connection with a bandgap reference circuit using parasitic p-n-p transistors in a CMOS technology, it is also contemplated that start-up circuits according to these embodiments may be used in connection with other types of bandgap reference circuits, such as constant transconductance MOS reference circuits, as well as in connection with other self-biasing reference circuits such as bias reference circuits and the like.

While one or more embodiments have been described in this specification, it is of course contemplated that modifications of, and alternatives to, these embodiments, such modifications and alternatives capable of obtaining one or more the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. The A circuit for generating a reference level, comprising:
   a reference circuit, comprising:
      a primary current branch, comprising a current control transistor having a source-drain path coupled on one side to a power supply voltage, and having a gate;
      an amplifier having inputs coupled to nodes in the primary current branch, having an active load comprising a current mirror including a mirror transistor having a conduction path coupled between a power supply voltage and an amplifier output node, the amplifier output node also coupled to the gate of the current control transistor; and
      a first output transistor conducting a first reference current responsive to a voltage at the amplifier output node; and
   a start-up circuit, comprising:
      a start-up transistor having a source coupled to the power supply voltage, and having a gate and a drain connected together at a start-up node coupled to the amplifier output node, the start-up transistor constructed in a matching manner relative to the current control transistor; and
      a first current source coupled between the start-up node and a ground reference voltage;
   wherein the start-up circuit further comprises:
      a first switch connected in series with the start-up transistor between the power supply voltage and the start-up node; and
      a second switch connected in series with the first current source between the start-up node and the ground reference voltage.

2. The circuit of claim 1, wherein the start-up circuit further comprises:
   switch logic for controlling the first and second switches so as to be closed during start-up of the reference circuit, and to be open after start-up of the reference circuit.

3. The circuit of claim 2, wherein the first switch comprises a first MOS transistor having a source-drain path connected in series with the start-up transistor between the power supply voltage and the start-up node and having a gate;
   and wherein the second switch comprises a second MOS transistor having a source-drain path connected in series with the first current source between the start-up node and the ground reference voltage.

4. The circuit of claim 3, wherein the switch logic comprises:
   a current comparator for comparing an external current with the first reference current, and having an output at a comparator node coupled to the gates of the first and second MOS transistors.

5. The circuit of claim 4, wherein the current comparator comprises:
   a second current source comprised of an output transistor of a bias reference circuit, for conducting the external current.

6. The circuit of claim 4, wherein the first and second MOS transistors are of complementary conductivity types relative to one another;

and wherein the switch logic further comprises:
an inverter having an input connected to the comparator node and an output connected to the gate of one of the first and second MOS transistors, so that the gates of the first and second MOS transistors receive complementary logic levels.

7. The circuit of claim 4, wherein the first output transistor comprises an n-channel MOS transistor having a source coupled to the ground reference voltage, a drain coupled to the comparator node, and a gate;

and wherein the reference circuit further comprises:
a first p-channel MOS transistor having a source coupled to the power supply voltage, a gate coupled to the output of the amplifier, and a drain; and
a diode-connected n-channel MOS transistor having a gate and a drain coupled together and to the gate of the first output transistor, and having a source coupled to the ground reference voltage.

8. The A circuit for generating a reference level, comprising:
a reference circuit, comprising:
a primary current branch, comprising a current control transistor having a source-drain path coupled on one side to a power supply voltage, and having a gate;
an amplifier having inputs coupled to nodes in the primary current branch, having an active load comprising a current mirror including a mirror transistor having a conduction path coupled between a power supply voltage and an amplifier output node, the amplifier output node also coupled to the gate of the current control transistor; and
a first output transistor conducting a first reference current responsive to a voltage at the amplifier output node; and
a start-up circuit, comprising:
a start-up transistor having a source coupled to the power supply voltage, and having a gate and a drain connected together at a start-up node coupled to the amplifier output node, the start-up transistor constructed in a matching manner relative to the current control transistor; and
a first current source coupled between the start-up node and a ground reference voltage;
wherein the start-up transistor is constructed in a matching manner relative to the current control transistor so that variations in channel length and threshold voltage in the current control transistor are reflected in the start-up transistor.

9. A method of starting up a reference circuit, comprising the steps of:
conducting a current through a diode-connected start-up transistor coupled between a power supply voltage and a start-up node to establish a start-up voltage at about a threshold voltage level below the power supply voltage, the start-up node connected to a gate of a current control transistor in a primary current branch of the reference circuit, wherein the start-up transistor is constructed in a matching manner relative to the current control transistor;
responsive to the conducting step establishing the start-up voltage at the start-up node, conducting current through the current control transistor;
responsive to the conducting step establishing the start-up voltage at the start-up node, conducting a first reference current through a first output transistor of the reference circuit; and
responsive to the conducting of current in the primary current branch, operating an amplifier having an amplifier output node coupled to the gate of the current control transistor;
further comprising:
comparing an external current with the first reference current;
wherein the step of conducting a current through a diode-connected start-up transistor is performed responsive to the external current exceeding the first reference current.

10. The method of claim 9, wherein the first reference current is stronger than the external current;
and further comprising:
responsive to the conducting of the first reference current, stopping the conducting of current through the diode-connected start-up transistor.

* * * * *